United States Patent [19]

Margulis

[11] Patent Number: 5,788,739

[45] Date of Patent: Aug. 4, 1998

[54] A PROCESS FOR RECOVERING METALLIC LEAD FROM EXHAUSTED BATTERIES

[75] Inventor: Efim Margulis, Haifa, Israel

[73] Assignee: Margulead Ltd., Kiryat-Yam, Israel

[21] Appl. No.: 597,748

[22] Filed: Feb. 6, 1996

[30] Foreign Application Priority Data

Jan. 24, 1996 [IL] Israel ......... 116884

[51] Int. Cl.$^6$ ............. C22B 7/00; C22B 13/00
[52] U.S. Cl. ............. 75/419; 75/693; 423/621; 429/49
[58] Field of Search ............. 75/693, 695, 701, 75/702, 419; 205/369; 429/49; 423/621

[56] References Cited

U.S. PATENT DOCUMENTS

| 4,058,396 | 11/1977 | Birk ............. 205/369 |
| 4,927,510 | 5/1990 | Ol per et al. ............. 429/49 |
| 5,242,482 | 9/1993 | Cangini et al. ............. 75/693 |

FOREIGN PATENT DOCUMENTS

| 709708 | 1/1980 | U.S.S.R. ............. 75/702 |
| 899693 | 1/1982 | U.S.S.R. ............. 75/702 |

OTHER PUBLICATIONS

"Recycling Lead and Zinc: The Challenge of the 1990's" by R. David Prengaman, Transaction of International Conference, Rome, Italy, Jun. 11–13, 1991.

*Primary Examiner*—Melvyn Andrews
*Attorney, Agent, or Firm*—Lowe Hauptman Gopstein Gilman & Berner

[57] ABSTRACT

The present invention relates to a process for the recovery of metallic lead from exhausted lead-acid batteries. According to the invention, the metallic scrap obtained thereof is treated by a smelting operation which is carried out under a layer of a molten flux. The flux comprises alkali hydroxide and optionally also carbonate(s) and sulfate(s) of said alkali. The temperature which is maintained during the smelting is between 350° C. to 600° C. and most preferably in the range of between 450° C. to 550° C. The preferred weight ratio between the metallic scrap and the flux is between 15 to 45. Generally, the alkali flux is selected from sodium hydroxide and potassium hydroxide and mixtures thereof. The process is characterized by a very extent of lead recovery compared with the known processes and absence of exhausted gases.

6 Claims, No Drawings

A PROCESS FOR RECOVERING METALLIC LEAD FROM EXHAUSTED BATTERIES

The present invention relates to a process for the recovery of lead from exhausted batteries. More particularly, the invention relates to an improved process for obtaining metallic lead from exhausted acid batteries and metallic scrap from other sources, which also resolves environmental problems and pollution.

BACKGROUND OF THE INVENTION

The recovery of lead from exhausted lead-acid batteries is quite extensively investigated and performed in a wide scale the goal being to reduce the costs of the process involved as well as to be more friendly to the environment. The new facilities now available enable an easy separation of the different battery components, obtaining two main constituents: metallic scrap and spent paste. According to the present practice, these constituents are processed together by reduction smelting at high temperature in the range of between 1150° C. to 1250° C. (see the report of R. D. Prengaman, in the book: "Recycling lead and zinc, The Challenge of the 1990" Rome, Italy 11–13 Jun., 1991, *Transaction of International Conference*, pages 437–444).

The content of metallic scrap in the scrapped battery lead is about 50% and does not require a high temperature for its smelting, provided that the oxide film could be removed from its surface. Generally, smelting of metallic scrap which is covered by an oxide film, can be processed at relatively low temperatures, in the range of between 450° C. to 650° C., but in this case only 65% to 70% lead from the total lead content could be recovered. The remaining lead is comprised in dross, i.e. a semi-product of lead, which has to be further processed by a reduction smelting.

The above brief review, shows that a novel process for obtaining a high recovery of metallic lead from exhausted lead-acid batteries would be most desirable.

It is an object of the present invention to provide an improved process for the recovery of metallic lead from exhausted batteries. It is another object of the present invention, to provide an improved process for the recovery of metallic lead from exhausted batteries, without producing hazardous materials and polluting gases. It is yet another object of the present invention, to provide an economical process for the recovery of metallic lead from exhausted batteries which requires much lower temperatures and energy costs than those known from the prior art.

BRIEF DESCRIPTION OF THE INVENTION

The invention relates to an improved process for the recovery of metallic lead from exhausted lead-acid batteries, whereby the metallic scrap obtained thereof is treated by a smelting operation which is carried out under a layer of a molten flux comprising alkali hydroxide, optionally in the presence of carbonates or sulfates of said alkali, at a temperature in the range of between 350° to 600° C. According to a preferred embodiment, the alkali flux comprises a mixture of sodium hydroxide and potassium hydroxide, optionally in the presence of carbonates and sulfates of said alkali metals.

DETAILED DESCRIPTION OF THE INVENTION

The metallic lead parts, as obtained from a mechanical disassembly of the exhausted lead-acid batteries after their separation, known by the term metallic scrap, is the main starting material used in the process according to the present invention.

The scrap was melted in a kettle, the main feature being the fact that the liquid lead was covered by a melt of flux. The flux comprises alkali hydroxide, optionally in the presence of carbonates and/or sulfates of said alkali, at a temperature in the range of between 350° C. to 600°C. and most preferably in the range of between 450° C. to 550° C. The scrap was fed continuously into a kettle, while the liquid metallic lead was taken out continuously via a siphon. The molten flux layer should continuously be stirred in order to obtain a homogeneous mass, maintaining a temperature in the range of between 350° C. to 600° C. and most preferably in the range of between 4506° C. to 550° C.

The melt flux covering the liquid lead does dissolve the oxidized lead from the metallic scrap and contains the following constituents:

between 65% to 100% sodium or potassium hydroxide;

between 0 to 35% sodium carbonate or potassium carbonate, and between 0 to 7% sodium sulfate or potassium sulfate.

This flux composition is characterized by a decreased aggressive action on the stirrer as well as on the kettle. Also, this composition will improve the rheological properties of the liquid flux, which is quite important when it has to be recovered by electrowinning of the dissolved lead from the flux.

The flux going out from the kettle, can be useful utilized in various ways. The simplest method is to smelt the used flux together with the spent paste, but in this case the flux is lost together with the slag and the lead present in the flux is extracted.

A more useful method is to treat the used flux by a leaching operation with water, thus obtaining an alkali solution as well as a powder of oxidized lead. The alkali solution may be utilized either for the neutralization of the spent acid solution resulted from the exhausted batteries, or for the desulfurization of the spent paste. The oxidized lead can be treated together with the spent paste and in this case the used flux has the role of a neutralizer.

In a most preferred method, the recovery of the used flux is carried out by electrowinning of the dissolved lead from the molten used flux and recycling the recovered flux to the smelting operation of the metallic scrap.

Generally, the weight ratio between the metallic scrap to said flux is between 15 to 45, depending on the temperature of the mass as well as to the particular composition of the flux and the content of the oxidized lead in the metallic scrap.

Comparing the present invention for the production of lead with the known melting processes of scrap at a low temperature without flux, it should be mentioned the following main advantages achieved by the present invention:

(a) The direct extraction of lead from scrap into the metal is much higher than other methods, being up to 95% compared with 67% according to the known processes.

(b) the flux covering the lead, prevents oxidation of the metallic lead during melting, and (c) the melting with a flux is significantly more economical and also more desirable from an environmental point of view.

The process is quite simple and requires standard equipment as used for such purpose. The scrap to be processed is loaded continuously in a kettle provided with a stirrer where it is melted and the liquid lead is tapped continuously, through a siphon or by a dipped pump. The lead, oxides which are co-produced, resulting from films on metallic pieces and from the paste admixture, are dissolved in the flux.

According to the present invention, the direct extraction of the lead from the scrap into metallic lead reaches an extent of about 90% to 95% from the total amount of scrap which is quite a very high recovery.

Summing up, among the advantages of the process according to the present invention compared with the known smelting process of metallic lead scrap, the following could be mentioned:

A significant decrease of the energy required for the lead recovery, due to the relatively low temperature used, without using blast.

The absence of exhausted gases, which is most important from the environmental point of view.

The very high extent of the lead recovery, compared with the known processes.

The invention will be hereafter illustrated in a detailed manner by the following Examples for producing metallic lead but it should be understood that the Examples are given only for a better understanding of the process without imposing any limitation to the invention as covered by the appended Claims.

EXAMPLE 1.

An amount of 1 kg of a flux had the following composition (weight per cent):

75.7% sodium hydroxide;

18.2% sodium carbonate and 6.1% sodium sulfate (all by weight percent).

The flux was melted in a stainless vessel at a temperature of about 550° C. using a dipped electrical heater.

To the vessel containing the melted flux, 23.4 kg of a metallic scrap, obtained from exhausted batteries, were added. The metallic scrap had the following composition (by weight):

grids: 74.4%;

connectors and terminals: 20.5%, and paste: 5.05%. The scrap was fed continuously in the vessel and the formed liquid metallic lead was tapped also continuously through a syphon. The resulted mass was thoroughly mixed, obtaining a liquid metallic lead under a layer of the melted flux containing the oxides disolved from the above scrap. The smelting operation was finished when the flux became more viscous and appears as a thick layer. At the end of the smelting, the flux was removed from the vessel and leached by water.

The amount of the metallic lead obtained was 21.67 kg having the following composition (weight percentage):

Pb: 97.96%; Sb: 1.89%; Cu: 0.025%;

Bi: 0.016%; Sn: 0.022%; As: 0.092%.

The impurities found consist only of traces of the following metals: Fe, Ag, Te, Ca, Mn, Al, Ba in the range of between 0.0001% to 0.0007%.

EXAMPLE 2.

An experiment as in Example 1 was carried out using an amount of 37.2 kg of a metallic scrap per 1 kg of flux. The composition of the scrap was as follows (by weight percent):

77.6% grids;

21.43% connectors and terminals, and 0.97% paste.

An amount of 35.27 kg of metallic lead was obtained, which was suitable for the production of the metallic part of new batteries.

I claim:

1. A process for the recovery of metallic lead and lead oxide from metallic scrap which contains lead and lead oxide obtained from exhausted lead-acid batteries, comprising the steps of:

continuously loading metallic scrap containing the lead and lead oxide obtained from exhausted-lead acid batteries into a vessel containing molten flux to form molten lead, whereby the molten lead is covered with a layer of molten flux;

said molten flux comprising alkali hydroxide, optionally in the presence of sulfate(s) of the respective alkali;

maintaining the temperature of the molten flux in a range of 350° C.–600° C.;

dissolving the lead oxide in the molten flux layer;

continuously tapping the molten lead from the vessel simultaneously with the loading of metallic scrap;

removing a portion of the molten flux layer containing lead oxide from the vessel;

leaching the molten flux layer with water and recovering lead oxide from the flux; and adding more flux to the molten flux layer.

2. The process according to claim 1 wherein the alkali flux is selected from sodium hydroxide and potassium hydroxide and mixtures thereof.

3. The process according to claim 1, wherein the temperature of the molten flux is maintained in a range of 450° C. to 550° C.

4. The process according to claim 1, wherein the molten flux covering the molten lead contains between 65% to 100% sodium or potassium hydroxide, between 0 to 35% sodium or potassium carbonate and between 0 to 7% sodium or potassium sulfate.

5. The process according to claim 1, wherein the weight ratio between the metallic scrap to said molten flux is between 15 and 45.

6. The process according to claim 1 further comprising the step of continuously stirring the molten flux layer to homogenize the molten flux layer.

* * * * *